Patented Aug. 24, 1954

2,687,440

UNITED STATES PATENT OFFICE 2,687,440

PREPARATION OF FLUORINATED ORGANIC COMPOUNDS

Frank C. McGrew, Wilmington, Del., and Edward H. Price, West Chester, Pa., assignors to E. I. du Pont de Nemours and Company, Wilmington, Del., a corporation of Delaware No Drawing. Application February 8, 1952, Serial No. 270,741

9 Claims. (Cl. 260—653)

This invention relates to the preparation of fluorinated organic compounds. More specifically, this invention relates to the preparation of fluorinated methanes and fluoroethylenes by reaction between a lower aliphatic hydrocarbon compound and a chloro-fluoro-methane.

The Benning et al. patent, U. S. 2,551,573, discloses a pyrolysis process whereby a chlorofluoro-methane, preferably $CHClF_2$, is transformed by heat alone into other fluorinated organic compounds, such as tetrafluoroethylene. Such processes usually involve dehydrohalogenation, with the hydrogen and halogen atoms being split from the same or different molecules of the same reactant. Starting materials containing hydrogen in the molecule, such as $CHClF_2$, must be used in such prior art processes. Materials, such as $CHClF_2$, have been difficult and expensive to obtain in the past.

An object of this invention is to produce monochlorodifluoromethane by a less expensive process than has been heretofore known. Another object is to produce 1,1-difluoroethylene by means of a process which is superior to methods heretofore known. Other objects appear hereinafter.

The present invention employs a chlorodifluoromethane as a starting material. Chlorine is removed from the chlorodifluoromethane starting material by reaction of a lower aliphatic hydrocarbon, such as methane, with the abovementioned starting material at a high temperature, in the presence of a metallic catalyst, or without a catalyst. Such a reaction probably produces free radicals such as $-CH_2-$ and $-CF_2-$ which combine to form an unsymmetrical difluoroethylene. Removal of only one chlorine atom may also take place to produce $CHClF_2$, which is a valuable starting material for the production of tetrafluoroethylene in the process described and claimed by Benning et al., U. S. 2,551,573. No limitations on the scope of this invention are intended by postulating any mechanism of the reaction.

In the preferred embodiment of the process of this invention, chlorodifluoromethane and a lower aliphatic hydrocarbon are continuously introduced, in the vapor phase, into a reactor that is maintained at a temperature from about 400° C. to about 1000° C. The reactant vapors are converted to the desired products in the presence of metallic catalysts containing platinum or copper. In the use of a platinum-containing catalyst it is preferred to employ the catalyst in the physical form of a gauze; while in the use of copper, it is preferred to employ the physical form of turnings. The preferred chlorodifluoromethane is $CCl_2F_2$, and the preferred lower aliphatic hydrocarbon is methane.

In the following examples various methods of producing $CH_2=CF_2$ and $CHClF_2$ by means of the process of this invention are shown. The gas volumes are given in the examples in terms of cubic centimeters at room temperature (25° C.) and at one atmosphere absolute pressure. The pressure inside the reactor tubes is, in the particular embodiments of this invention, less than about two atmospheres absolute pressure. In each of the examples the reaction tube is placed in an electric furnace which supplies the heat necessary to maintain the reaction temperature from about 400° C. to about 1000° C. The reaction tube is sufficiently long to extend beyond the furnace at either end, while the central portion of the tube, 8¾ inches long, remains within the furnace and is subjected to the furnace heat. The contact times are calculated on the volume of the "hot zone" of the reaction tube; the "hot zone" being defined as the space enclosed by the portion of the reaction tube which is subjected to the furnace heat. In all examples, the volume of the "hot zone" is the product of the internal cross-sectional area of the reaction tube and a length of 8¾ inches. The temperatures of the reacting gases passing through the reaction tube are not uniform throughout the length of the tube. The non-uniformity of the temperatures may be due to various factors, such as (1) the heat of the reaction and (2) the temperature gradient caused by the flow of mixed gases undergoing chemical reactions. The temperatures, therefore, are reported in the examples as a range of temperatures which represent the fluctuations of the temperatures of the reacting gases in the "hot zone." The product gases in each example are collected from the outlet of the reactor tube, cooled, scrubbed with aqueous alkali to remove acidic gases, such as HF and HCl, and are thus prepared for analysis.

Example I

A quartz tube, 12 mm. inside diameter and 3 feet long, was placed in an electric furnace which produced sufficient heat to maintain the temperature of the vapors in the tube at 720° to 760° C. The reactant vapors were fed into one end of the tube at the following rates:

$CCl_2F_2$ _____cubic centimeters per minute\_\_ 200
$CH_4$ _____do\_\_\_\_ 196

This rate gave a contact time of 3.8 seconds.

The product contained the following relative mol proportions of halocarbons and halohydrocarbons:

| | Per cent |
|---|---|
| $CCl_2F_2$ | 89.0 |
| $CHClF_2$ | 1.4 |
| $CH_2=CF_2$ | 6.8 |
| $CF_3Cl$ | 1.4 |
| Others | 1.5 |

*Example II*

The same equipment was used as described in Example I above. The temperature of the vapors inside the tube was maintained at 720° to 760° C. The reactant vapors were fed into one end of the tube at the following rates:

$CCl_2F_2$ _____cubic centimeters per minute__ 124
$CH_4$ _____do____ 112

This rate gave a contact time of 6.4 seconds. The product contained the following relative mol proportions of halocarbons and halohydrocarbons:

| | Per cent |
|---|---|
| $CCl_2F_2$ | 87.1 |
| $CF_2=CF_2$ | 0.4 |
| $CHClF_2$ | 2.3 |
| $CH_2=CF_2$ | 7.4 |
| $CH_2F_2$ | 1.7 |
| $CF_3Cl$ | 1.1 |

This example shows, by comparison to Example I, that with all other conditions remaining the same, a lower feed rate, or higher contact time, gives a higher concentration of the desired products, $CHClF_2$ and $CH_2=CF_2$.

*Example III*

The same equipment was used as described in Example I above. The temperature of the vapors inside the tube was maintained at 770° to 810° C. The reactant vapors were fed into one end of the tube at the following rates:

$CCl_2F_2$ _____cubic centimeters per minute__ 300
$CH_4$ _____do____ 244

This rate gave a contact time of 2.7 seconds. The product contained the following relative mol proportions of halocarbons and halohydrocarbons:

| | Per cent |
|---|---|
| $CCl_2F_2$ | 75.1 |
| $CHClF_2$ | 3.7 |
| $CH_2=CF_2$ | 16.5 |
| $CF_3Cl$ | 1.7 |
| $CH_2=CHF$ | 2.6 |
| Others | 0.5 |

*Example IV*

The same equipment was used as described in Example I above, except that a gauze made of 90% platinum–10% rhodium alloy, 4½ inches square, was rolled loosely and placed in the center of the tube. The temperature of the vapors inside the tube was maintained at 720° to 760° C. The reactant vapors were fed into one end of the reactor tube at the following rates:

$CCl_2F_2$ _____cubic centimeters per minute__ 300
$CH_4$ _____do____ 196

This rate gave a contact time of 3.0 seconds. The product contained the following relative mol proportions of halocarbons and halohydrocarbons:

| | Per cent |
|---|---|
| $CCl_2F_2$ | 92.3 |
| $CHClF_2$ | 2.3 |
| $CH_2=CF_2$ | 3.8 |
| $CH_2F_2$ | 0.9 |
| $CF_3Cl$ | 0.8 |

*Example V*

The same equipment was used as described in Example I above, except that a gauze made of 90% platinum–10% rhodium alloy, 9 inches square, was rolled loosely and placed in the center of the tube. The temperature of the vapors inside the tube was maintained at 770° to 810° C. The reactant vapors were fed into one end of the reactor tube at the following rates:

$CCl_2F_2$ _____cubic centimeters per minute__ 300
$CH_4$ _____do____ 244

This rate gave a contact time of 2.7 seconds. The product contained the following relative mol proportions of halocarbons and halohydrocarbons:

| | Per cent |
|---|---|
| $CCl_2F_2$ | 66.3 |
| $CF_2=CF_2$ | 1.5 |
| $CHClF_2$ | 6.8 |
| $CH_2=CF_2$ | 19.9 |
| $CF_3Cl$ | 2.7 |
| $CH_2=CHF$ | 2.8 |

*Example VI*

The same equipment was used as described in Example I, except that a gauze made of 90% platinum–10% rhodium alloy, 4½ inches square, was rolled loosely and placed in the center of the tube. The temperature of the vapors inside the tube was maintained at 720° to 760° C. The reactant vapors were fed into one end of the reactor tube at the following rates:

$CCl_2F_2$ _____cubic centimeters per minute__ 300
$CH_4$ _____do____ 245

This rate gave a contact time of 2.7 seconds. The product contained the following relative mol proportions of halocarbons and halohydrocarbons:

| | Per cent |
|---|---|
| $CCl_2F_2$ | 96.2 |
| $CHClF_2$ | 1.7 |
| $CH_2=CF_2$ | 1.8 |
| $CF_3Cl$ | 0.3 |

By comparing Example VI with Example V it can be seen that the use of a catalyst with larger surface area, at a higher temperature, has increased the concentration of $CH_2=CF_2$ tenfold and quadrupled the concentration of $CHClF_2$.

*Example VII*

The same equipment was used as described in Example I above, except that ordinary copper turnings were packed loosely into the tube so as to fill about 9 inches of the center of the tube. The temperature of the vapors inside the tube was maintained at 670° to 720° C. The reactant vapors were fed into one end of the reactor tube at the following rates:

$CCl_2F_2$ _____cubic centimenters per minute__ 300
$CH_4$ _____do____ 196

This rate gave a contact time of 3.0 seconds. The product contained the following relative mol proportions of halocarbons and halohydrocarbons:

| | Per cent |
|---|---|
| $CCl_2F_2$ | 80.8 |
| $CHClF_2$ | 7.8 |
| $CH_2=CF_2$ | 8.4 |
| $CH_2F_2$ | 1.6 |
| $CF_3Cl$ | 1.4 |

Example VIII

The same equipment was used as described in Example I above, except that ordinary copper turnings were loosely packed inside the tube so as to fill about 9 inches of the center of the tube. The temperature of the vapors inside the tube was maintained at 720° C. to 760° C. The reactant vapors were fed into one end of the tube at the following rates:

$CCl_2F_2$ ____cubic centimeters per minute____ 300
$CH_4$ _____do____ 244

This rate gave a contact time of 2.7 seconds. The product contained the following relative mol proportions of halocarbons and halohydrocarbons:

| | Per cent |
|---|---|
| $CCl_2F_2$ | 56.9 |
| $CF_2=CF_2$ | 1.8 |
| $CHClF_2$ | 11.0 |
| $CH_2=CF_2$ | 19.2 |
| $CF_3Cl$ | 4.4 |
| $CH_2=CHF$ | 5.6 |
| Others | 1.6 |

Example IX

The same equipment was used as described in Example I above, except that ordinary copper turnings were loosely packed inside the tube so as to fill about 9 inches of the center of the tube. The temperature of the vapors inside the tube was maintained at 675° to 715° C. The reactant vapors were fed into one end of the tube at the following rates:

$CCl_2F_2$ _____cubic centimeters per minute__ 300
$CH_4$ _____do____ 245

This rate gave a contact time of 2.7 seconds. The product contained the following relative mol proportions of halocarbons and halohydrocarbons:

| | Per cent |
|---|---|
| $CCl_2F_2$ | 88.6 |
| $CF_2=CF_2$ | 0.6 |
| $CHClF_2$ | 4.1 |
| $CH_2=CF_2$ | 4.3 |
| $CH_2F_2$ | 1.4 |
| Others | 1.0 |

Comparing this example to Example VII it can be seen that all variables were kept constant, except that a lower temperature and a slightly shorter contact time were used in Example VIII, causing lower conversions to the desired products, $CHClF_2$ and $CH_2=CF_2$.

Example X

The same equipment was used as described in Example I above. The temperature of the vapors inside the tube was maintained at 740° to 790° C. The reactant vapors were fed into one end of the tube at the following rates:

$CCl_2F_2$_____cubic centimeters per minute__ 300
$C_2H_6$ _____do____ 241

This rate gave a contact time of 2.7 seconds. The product contained the following relative mol proportions of halocarbons and halohydrocarbons:

| | Per cent |
|---|---|
| $CCl_2F_2$ | 89.9 |
| $CH_2=CF_2$ | 4.3 |
| $CHClF_2$ | 2.8 |
| $CH_2F_2$ | 1.5 |
| $CF_3Cl$ | 0.5 |

Example XI

The same equipment was used as described in Example I above, except that ordinary copper turnings were loosely packed inside the tube so as to fill about 9 inches of the center of the tube. The temperature of the vapors inside the tube was maintained at 650° to 690° C. The reactant vapors were introduced into one end of the tube at the following rates:

$CCl_2F_2$ _____cubic centimeters per minute__ 300
$C_2H_6$ _____do____ 243

This rate gave a contact time of 2.7 seconds. The product contained the following relative mol proportions of halocarbons and hydrocarbons:

| | Per cent |
|---|---|
| $CCl_2F_2$ | 88.4 |
| $CH_2=CF_2$ | 4.1 |
| $CHClF_2$ | 5.4 |
| $CF_2=CF_2$ | 0.8 |
| $CH_2F_2$ | 1.0 |
| $CF_3Cl$ | 0.3 |

It has been found that three of the variables of the invention may be changed singly, or in combination with each other, to give differing product yields. These three critical variables are: the temperature of the reacting vapors, the catalyst used, and the contact time for the reaction. In general, a higher temperature may increase the conversion, although extremely high temperatures may cause decomposition of the organic vapors. The use of the catalyst in a physical form offering a large surface area, such as a gauze or as turnings, will usually give greater yields of the desired products. In addition, the metallic catalysts, such as platinum alloy and copper, have been found to change the proportion of $CHClF_2$ to $CH_2=CF_2$ in the products to a different proportion from that obtained when no catalyst is used. Contact time, which is controlled by the feed rate, has been found to affect the relative proportions of the desired products. Thus, a shorter contact time will, in general, give a lower production of $CHClF_2$ and $CH_2=CF_2$, and a longer contact time will, in general, give a higher production of $CHClF_2$ and $CH_2=CF_2$. A comparison of the various examples recited will illustrate the effect of changing the temperature, catalyst, and contact time, either singly or in conjunction with another variable.

The operable limits of the temperatures of the reacting vapors have been found to be from about 400° C. to about 1000° C. Below 400° C. there appears to be such a substantial decrease in conversion that a commercial process is not feasible, even with longer contact times. At about 1000° C. increasing decomposition and formation of less desirable products occurs as higher and higher temperatures are employed, with the result that the process becomes impractical.

Metallic catalysts such as platinum alloy and copper give the best results and are preferred in the embodiment of the invention in which a catalyst is used, although this process is operable in the absence of a catalyst. Platinum alloy of 90% platinum-10% rhodium has been shown in the examples, however pure platinum and alloys of platinum with other metals, such as, palladium, iridium, and others known to those skilled in the art, may be used in this process to obtain substantially the same results. Other catalysts that may be employed at lower temperatures to give lower yields are cooper-chromium oxides, cobalt oxides, nickel oxides and other hydrogenation catalysts familiar to those skilled in this field.

One of the main advantages of this invention is the use of a lower aliphatic saturated hydrocarbon as one of the reactants. In processes heretofore used, all the carbon atoms in the products had to come from the halogenated alkane starting material. In the present invention carbon atoms are derived both from the halogenated alkane and from the hydrocarbon.

In the reaction of $CH_4$ with $CCl_2F_2$, 2 mols of HCl can theoretically be formed, and thus give rise to the probable formation of the radicals —$CF_2$— and —$CH_2$—, one probably coming from $CCl_2F_2$ and the other probably coming from $CH_4$. These two radicals could then reform to produce one of the desired products, $CH_2=CF_2$. Since the cost of the starting materials usually determines the cost of the product, this invention produces a useful polymerizable, fluorinated olefin by a much cheaper process than any other known at the present time, because of the fact that half of the carbon atoms have their source in methane, which is a larger, and more widely available, source of supply than any halogenated methane.

Other hydrocarbons can be used as reactants in this invention. Ethane, propane, and butane can be used in place of methane, although slightly different operating conditions are preferred to produce the desired products. Methane is the hydrocarbon preferably used in this invention, although the process is not intended to be limited to the use of methane, exclusive of other saturated aliphatic hydrocarbons.

The products of this invention are various chlorinated and fluorinated methane and ethylene derivatives, although longer chain derivatives can be produced by using ethane, propane, and butane as reactants. The more valuable components of the products of this process are $CHClF_2$ and $CH_2=CF_2$. $CHClF_2$ is a valuable intermediate to tetrafluoroethylene. Both $CHClF_2$ and $CH_2=CF_2$ are valuable intermediates to solvents, various materials employed as refrigerants, and other commercial chemicals. Vinylidene fluoride ($CH_2=CF_2$) and vinyl fluoride ($CH_2=CHF$), some of the latter also being produced in this process, are both valuable in that they may each be polymerized to desirable polymeric products. It is particularly advantageous that this process produces several halogenated compounds and that this process is flexible enough to allow control of the relative amounts of $CHClF_2$ and $CH_2=CF_2$ produced. By changing the variables of temperature, catalyst, and contact time, the proportion of $CHClF_2$ to $CH_2=CF_2$ can be increased or decreased, corresponding to the degree of completeness with which this reaction is carried out.

The desired compounds can be separated from the product mixture by ordinary methods of low temperature distillation and condensation known to those skilled in the art. Yields can be improved by recycling the by-products and unconverted reactants.

We claim:

1. The process for converting dichlorodifluoromethane to other fluorinated organic compounds which comprises heating a mixture of the vapors of dichlorodifluoromethane and a saturated lower aliphatic hydrocarbon at a temperature from about 400° C. to about 1000° C.

2. The process for converting dichlorodifluoromethane to other fluorinated organic compounds which comprises heating a mixture of the vapors of dichlorodifluoromethane and a saturated lower aliphatic hydrocarbon in the presence of a metallic, platinum-containing catalyst at a temperature from about 400° C. to about 1000° C.

3. The process for converting dichlorodifluoromethane to other fluorinated organic compounds which comprises heating a mixture of the vapors of dichlorodifluoromethane and a saturated lower aliphatic hydrocarbon in the presence of a metallic copper catalyst at a temperature from about 400° C. to about 1000° C.

4. The process for converting dichlorodifluoromethane to other fluorinated organic compounds which comprises heating a mixture of the vapors of dichlorodifluoromethane and a saturated lower aliphatic hydrocarbon at a temperature from about 400° C. to about 1000° C., and recovering the fluorinated organic compounds from the resulting mixture.

5. The process for converting dichlorodifluoromethane to other fluorinated organic compounds which comprises heating a mixture of methane vapors and dichlorodifluoromethane vapors at a temperature from about 400° C. to about 1000° C.

6. The process for converting dichlorodifluoromethane to other fluorinated organic compounds which comprises heating a mixture of methane vapors and dichlorodifluoromethane vapors at a temperature from about 550° C. to about 850° C.

7. The process for converting dichlorodifluoromethane to other fluorinated organic compounds which comprises heating a mixture of methane vapors and dichlorodifluoromethane vapors at a temperature from about 550° C. to about 850° C., and recovering a fluorinated compound from the group consisting of monochlorodifluoromethane, 1,1-difluoroethylene, and monofluoroethylene.

8. The process for converting dichlorodifluoromethane to other fluorinated organic compounds which comprises heating a mixture of methane vapors and dichlorodifluoromethane vapors at a temperature from about 550° C. to about 850° C., in the presence of a metallic, platinum-containing catalyst, and recovering a fluorinated compound from the group consisting of monochlorodifluoromethane, 1,1-difluoroethylene and monofluoroethylene.

9. The process for converting dichlorodifluoromethane to other fluorinated organic compounds which comprises heating a mixture of methane vapors and dichlorodifluoromethane vapors at a temperature from about 550° C. to about 850° C., in the presence of a metallic copper catalyst, and recovering a fluorinated compound from the group consisting of monochlorodifluoromethane, 1,1-difluoroethylene, and monofluoroethylene.

References Cited in the file of this patent

UNITED STATES PATENTS

| Number | Name | Date |
|---|---|---|
| 2,384,821 | Downing et al. | Sept. 18, 1945 |
| 2,551,573 | Downing et al. | May 8, 1951 |
| 2,566,807 | Padbury et al. | Sept. 4, 1951 |
| 2,599,631 | Harmon | June 10, 1952 |